(12) United States Patent
Connolly et al.

(10) Patent No.: US 11,423,354 B2
(45) Date of Patent: Aug. 23, 2022

(54) SMART SHELF SYSTEMS AND METHODS OF OPERATING THE SAME

(71) Applicant: ZEBRA TECHNOLOGIES CORPORATION, Lincolnshire, IL (US)

(72) Inventors: Sean Connolly, Stony Brook, NY (US); Russell Calvarese, Stony Brook, NY (US); David Bellows, Old Westbury, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 163 days.

(21) Appl. No.: 16/810,566

(22) Filed: Mar. 5, 2020

(65) Prior Publication Data

US 2021/0279671 A1  Sep. 9, 2021

(51) Int. Cl.
*G06Q 10/08* (2012.01)
*G06K 7/10* (2006.01)
*G06K 7/14* (2006.01)
*G06F 16/23* (2019.01)

(52) U.S. Cl.
CPC ....... *G06Q 10/087* (2013.01); *G06F 16/2379* (2019.01); *G06K 7/10722* (2013.01); *G06K 7/1413* (2013.01)

(58) Field of Classification Search
CPC .............. G06Q 10/087; G06F 16/2379; G06K 7/10722; G06K 7/1413
See application file for complete search history.

(56) References Cited

U.S. PATENT DOCUMENTS

| | | | |
|---|---|---|---|
| 10,592,854 B2* | 3/2020 | Schwartz | G06K 9/6267 |
| 2009/0059270 A1 | 3/2009 | Opalach et al. | |
| 2015/0088703 A1* | 3/2015 | Yan | G06F 3/147 |
| | | | 705/28 |
| 2017/0234746 A1 | 8/2017 | Cohen et al. | |
| 2018/0276596 A1* | 9/2018 | Murthy | G06K 9/00771 |
| 2019/0362300 A1 | 11/2019 | Bottine et al. | |

OTHER PUBLICATIONS

International Search Report and Written Opinion for International Application No. PCT/US2021/19530 dated May 19, 2021.

\* cited by examiner

*Primary Examiner* — Laura A Gudorf

(57) ABSTRACT

Smart shelf systems and methods of operating the same are disclosed herein. An example method includes determining a current position of a divider on a smart shelf based on sensor outputs of the smart shelf at the current position responsive to the divider positioned at the current position; comparing the current position of the divider to an intended position of the divider; and providing a first alert when the current position of the divider does not match the intended position of the divider. In some examples, the intended position of the divider is updated to the current or an installed position of the divider.

37 Claims, 7 Drawing Sheets

SMART SHELF SYSTEMS AND METHODS OF OPERATING THE SAME

BACKGROUND

Conventional shelf solutions rely on a planogram to identify where merchandise items are located in a store, e.g., where they start and where they end on a given shelf. Throughout the day, items are often incidentally shifted and moved by shoppers, causing the planogram to not reflect actual item locations and therefore become inaccurate. The tidying and facing of shelves is often performed very quickly (e.g., just a second or two per shelf) and, thus, resultant dividers might be moved further from their intended locations. Existing methods of manually updating the planogram using a mobile computer have shortcomings. They require the workers facing the shelves to have access to the mobile computer, which may not be feasible or practical. Furthermore, using the mobile computer itself is time consuming; what normally takes a second or two is increased as a worker navigates the menus of an application on the mobile computer to update the planogram. The planogram will be inaccurate until it is updated to accurately reflect the current positioning of items on the shelf. Moreover, if shelf labels (e.g., electronic shelf labels) are present, it can be time consuming to move them, update their displayed content, and/or change their targeted shelf width.

SUMMARY

Smart shelf systems and methods of operating the same are disclosed herein. A disclosed example "smart" shelf system includes a "smart" shelf, one or more shelf dividers, and a computing device. The smart shelf is able to automatically, electronically, without human assistance, etc. detect the presence of and the positions of the shelf dividers on the shelf and convey the presences and positions (e.g., location, etc.) to a communicatively coupled computing device. An example shelf includes a force, pressure, etc. sensitive smart shelf mat having a plurality of sensors (e.g., an array of sensors). When a divider is installed to a shelf, sensors associated with the location of the divider will cause corresponding ones of sensor outputs to activate. The shelf or a computing device to which sensor outputs are communicated can use the sensor outputs to determine the location of the divider. The shelf or a computing device can automatically update a planogram associated with the shelf based on the determined divider location. In some examples, a divider has a unique physical pattern on the lower edge of the divider that contacts the smart shelf mat that allows the divider to be uniquely identified by the corresponding pattern of sensor outputs. In some examples, the shelf communicates with dividers to electronically determine the positions. Examples and combinations thereof include at least the following.

Embodiment 1 is a method including: determining a current position of a divider on a smart shelf based on sensor outputs of the smart shelf at the current position responsive to the divider positioned at the current position; comparing the current position of the divider to an intended position of the divider; and providing a first alert when the current position of the divider does not match the intended position of the divider.

Embodiment 2 is a variation of the method of embodiment 1, wherein the intended position of the divider is a target position for the divider indicated in a planogram.

Embodiment 3 is a variation of the method of embodiment 2, wherein the planogram is stored in a planogram database for the shelf at least one of a) prior to installation of dividers to the smart shelf, or b) based on actual divider locations once installed to the smart shelf.

Embodiment 4 is a variation of the method of embodiment 1, wherein the intended position of the divider is an initially installed position of the divider.

Embodiment 5 is a variation of the method of embodiment 1, further comprising updating the intended position based on the current position.

Embodiment 6 is a variation of any of the methods of embodiments 1 to 5, further comprising: accessing an identifier for the divider; locating the position of the divider in a planogram based on the identifier; determining the intended position for the divider based on the position of the divider in the planogram; and comparing the current position of the divider with the intended position of the divider.

Embodiment 7 is a variation of any of the methods of embodiments 1 to 6, further comprising: sensing one or more characteristics of a product present in a lane adjacent to the divider; and determining whether the product is an intended product for the lane based on the sensed one or more sensed characteristics.

Embodiment 8 is a variation of any of the methods of embodiments 1 to 6, wherein accessing the identifier for the divider includes processing sensor outputs of the smart shelf representing a pattern of at least one of a) a plurality of raised features or b) a plurality of negative equivalents thereof on the divider in contact with the smart shelf, wherein the pattern represents the identifier for the divider.

Embodiment 9 is a variation of the method of embodiment 8, wherein the pattern includes a preamble configured to reduce misinterpretation of another pattern as the identifier.

Embodiment 10 is a variation of any of the methods of embodiments 1 to 6, wherein accessing the identifier for the divider includes accessing a barcode on the divider for the purpose of associating a product ID or a UPC with the divider.

Embodiment 11 is a variation of any of the methods of embodiments 1 to 6, wherein accessing the identifier for the divider includes accessing a barcode on the divider using at least one of a shelf level camera, a ceiling mounted camera, a handheld mobile computer, or a scanner.

Embodiment 12 is a variation of any of the methods of embodiments 1 to 11, wherein the sensor outputs are first sensor outputs, and further comprising: determining a plurality of positions of a plurality of shelf labels on the smart shelf based on second sensor outputs of the smart shelf; determining a plurality of positions of a plurality of dividers on the smart shelf based on third sensor outputs of the smart shelf; and when a plurality of shelf labels are between a pair of dividers, providing a second alert.

Embodiment 13 is a variation of the method of embodiment 12 wherein at least one of the shelf labels is an electronic shelf label.

Embodiment 14 is a variation of any of the methods of embodiments 1 to 11, wherein the sensor outputs are first sensor outputs, and further comprising: determining a plurality of positions of a plurality of shelf labels on the smart shelf based on second sensor outputs of the smart shelf; determining a plurality of positions of a plurality of dividers on the smart shelf based on third sensor outputs of the smart shelf; and when no shelf label is between a pair of dividers, providing a second alert.

Embodiment 15 is a variation of any of the methods of embodiments 1 to 11, wherein the sensor outputs are first sensor outputs, and further comprising: determining a plurality of positions of a plurality of dividers on the smart shelf based on second outputs of the smart shelf; identifying whether there is an inconsistency in an arrangement pattern of the plurality of the dividers; and when the inconsistency is identified, providing a second alert.

Embodiment 16 is a variation of any of the methods of embodiments 1 to 15, wherein the sensor outputs are first sensor outputs, and further comprising: determining a plurality of positions of a plurality of shelf labels on the smart shelf based on second sensor outputs of the smart shelf; determining a plurality of positions of a plurality of dividers on the smart shelf based on third sensor outputs of the smart shelf; creating an actual planogram based on the plurality of positions of the plurality of shelf labels on the smart shelf and the plurality of positions of the plurality of dividers; and creating a depiction of an overlay of an intended planogram and the actual planogram.

Embodiment 17 is a variation of the method of embodiment 16, further comprising omitting from the overlay a difference between the intended planogram and the actual planogram based on a comparison of the difference and a threshold.

Embodiment 18 is a variation of any of the methods of embodiments of 1 to 17, wherein detecting the current position of the divider on the smart shelf includes sensing a plurality of raised features of the divider in contact with the smart shelf.

Embodiment 19 is a variation of any of the methods of embodiments 1 to 18, wherein determining the current position of the divider on the smart shelf includes sensing a linear feature of the divider in contact with the smart shelf.

Embodiment 20 is a variation of any of the methods of embodiments 1 to 19, wherein the sensor outputs are associated with an array of sensors on a surface of the smart shelf.

Embodiment 21 is a variation of the method of embodiment 20, wherein the array of sensors are at least one of a pressure sensor, a capacitive sensor, a resistive sensor, an optical sensor, or a light sensing sensor.

Embodiment 22 is a method of operating a smart shelf system comprising: automatically determining, with a smart shelf, a current position of a divider on the smart shelf; comparing the current position of the divider to an intended position of the divider; and providing a first alert when the current position of the divider does not match the intended position of the divider.

Embodiment 23 is a variation of the method of embodiment 22, wherein determining the current position includes determining the current position based on sensor outputs of a mat of the smart shelf.

Embodiment 24 is a variation of the method of embodiment 22, wherein the intended position is at least one of defined in a planogram or an initially installed position.

Embodiment 25 is a variation of any of the methods of embodiments 22 or 23, further comprising: accessing an identifier for the divider; locating the position of the divider in a planogram based on the identifier; determining the intended position for the divider based on the position of the divider in the planogram; and comparing the current position of the divider with the intended position of the divider.

Embodiment 26 is a variation of any of the methods of embodiments 22 or 23, wherein accessing the identifier for the divider includes at least one of a) accessing a barcode on the divider, or b) processing sensor outputs of the smart shelf representing a pattern of at least one of a) a plurality of raised features or b) a plurality of negative equivalents thereof on the divider in contact with the smart shelf, wherein the pattern represents the identifier for the divider.

Embodiment 27 is a variation of any of the methods of embodiments 22 to 26, further comprising: determining, with the smart shelf, a plurality of positions of a plurality of shelf labels on the smart shelf; determining, with the smart shelf, a plurality of positions of a plurality of dividers on the smart shelf; and when at least one of a) a plurality of shelf labels are between a pair of dividers or b) no shelf label is between a pair of dividers, providing a second alert.

Embodiment 28 is a variation of any of the methods of embodiments 22 to 27, further comprising: determining, with the smart shelf, a plurality of positions of a plurality of dividers on the smart shelf; identifying whether there is an inconsistency in an arrangement pattern of the plurality of the dividers; and when the inconsistency is identified, providing a second alert.

Embodiment 29 is a variation of any of the methods of embodiments 22 to 28, further comprising: determining, with the smart shelf, a plurality of positions of a plurality of shelf labels on the smart shelf; determining, with the smart shelf, a plurality of positions of a plurality of dividers on the smart shelf; creating an actual planogram based on the plurality of positions of the plurality of shelf labels on the smart shelf and the plurality of positions of the plurality of dividers on the smart shelf; and creating a depiction of an overlay of an intended planogram and the actual planogram.

Embodiment 30 is a non-transitory computer-readable storage medium comprising instructions that, when executed, cause a system to: automatically determine, with a smart shelf, a current position of a divider on the smart shelf; compare the current position of the divider to an intended position of the divider; and provide a first alert when the current position of the divider does not match the intended position of the divider.

Embodiment 31 is a variation of the non-transitory computer-readable storage medium of embodiment 30, wherein the instructions, when executed, cause the system to determine the current position based on sensor outputs of a mat of the smart shelf.

Embodiment 32 is a variation of the non-transitory computer-readable storage medium of embodiment 30 or 31, wherein the intended position is at least one of defined in a planogram or an initially installed position.

Embodiment 33 is a variation of the non-transitory computer-readable storage medium of embodiment 30 or 31, wherein the instructions, when executed, cause the system to: access an identifier for the divider; locate the position of the divider in a planogram based on the identifier; determine the intended position for the divider based on the position of the divider in the planogram; and compare the current position of the divider with the intended position of the divider.

Embodiment 34 is a variation of the non-transitory computer-readable storage medium of any of embodiments 30 to 33, wherein the instructions, when executed, cause the system to access the identifier for the divider by at least one of a) accessing a barcode on the divider, or b) processing sensor outputs of the smart shelf representing a pattern of at least one of a) a plurality of raised features or b) a plurality of negative equivalents thereof on the divider in contact with the smart shelf, wherein the pattern represents the identifier for the divider.

Embodiment 35 is a variation of the non-transitory computer-readable storage medium of any of embodiments 30 to 34, wherein the instructions, when executed, cause the system to: determine, with the smart shelf, a plurality of positions of a plurality of shelf labels on the smart shelf; determine, with the smart shelf, a plurality of positions of a plurality of dividers on the smart shelf; and when at least one of a) a plurality of shelf labels are between a pair of dividers or b) no shelf label is between a pair of dividers, provide a second alert.

Embodiment 36 is a variation of the non-transitory computer-readable storage medium of any of embodiments 30 to 35, wherein the instructions, when executed, cause the system to: determine, with the smart shelf, a plurality of positions of a plurality of dividers on the smart shelf; identify whether there is an inconsistency in an arrangement pattern of the plurality of the dividers; and when the inconsistency is identified, provide a second alert.

Embodiment 37 is a variation of the non-transitory computer-readable storage medium of any of embodiments 30 to 36, wherein the instructions, when executed, cause the system to: determine, with the smart shelf, a plurality of positions of a plurality of shelf labels on the smart shelf; determine, with the smart shelf, a plurality of positions of a plurality of dividers on the smart shelf; create an actual planogram based on the plurality of positions of the plurality of shelf labels on the smart shelf and the plurality of positions of the plurality of dividers on the smart shelf; and create an overlay of an intended planogram and the actual planogram.

Figure 1:
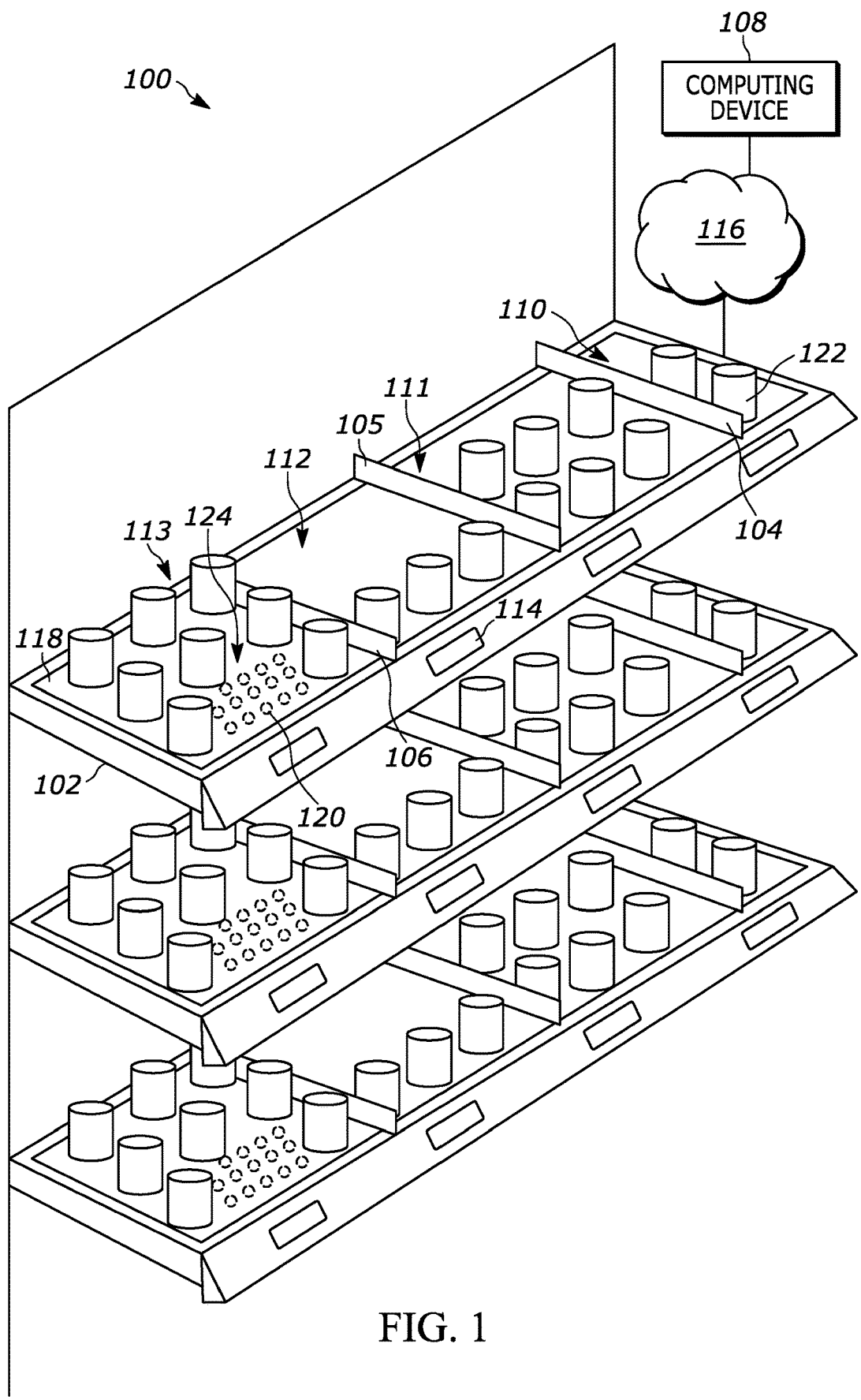
FIG. 1 illustrates an example smart shelf system, in accordance with aspects of described embodiments.

In the accompanying figures, like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention. In general, the same reference numbers will be used throughout the drawing(s) and accompanying written description to refer to the same or like parts.

The apparatus and method components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein. Skilled artisans will readily recognize from the following discussion that alternate embodiments of the structures and methods illustrated herein may be employed without departing from the principles set forth herein.

DETAILED DESCRIPTION

Reference will now be made in detail to non-limiting examples, some of which are illustrated in the accompanying drawings.

While examples disclosed herein are described in connection with smart shelf systems and methods of operating the same for use in retail establishments, they may be used in other environments such as storage areas, stock areas, warehouses, etc.

Referring to FIG. 1, an example smart shelf system 100 is shown. The shelf system 100 includes any number and/or type(s) of smart shelves, one of which is designated at reference numeral 102, any number and/or type(s) of shelf dividers, three of which are designated at reference numerals 104, 105, and 106, and any number and/or type(s) of computing devices, one of which is designated at reference numeral 108, to which the shelf 102 is in communication. The smart shelf 102 is able to automatically, electronically, without human assistance, etc. detect the presence of and the positions of the shelf dividers 104-106 on the shelf 102, and convey the presences and locations (e.g., position, etc.) to the communicatively coupled computing device 108. The dividers 104-106 divide the shelf 102 into a plurality of regions, zones, lanes, etc. 110, 111, 112, and 113 for respective products. The regions 110-113 are defined by an adjacent pair of the dividers 104-106. In the example of FIG. 1, each region 110-113 has a shelf label, one of which is designated at reference numeral 114 for the region. The shelf dividers 104-106 and labels 114 may be owned by a store, a vendor, etc. In some examples, the shelf labels 114 are detected by, for example, sensors on a front edge of the shelf 102. Additionally and/or alternatively, shelf labels 114 may be detectable, readable, identified, etc. by a camera, reader, scanner, etc. A camera may be a shelf level camera, a ceiling mounted camera, a handheld camera, etc.

The computing device 108 may be, for example, a server, a personal computer, a workstation, a laptop computer, a mobile device (e.g., a cell phone, a smart phone, a tablet such as an IPAD™), or any other type of computing device. The smart shelf 102 may be in communication with the computing device 108 via, for example, any number and/or type(s) communication pathways 116 (e.g., a communication network such as the Internet, a local area network (LAN), a wireless fidelity (Wi-Fi) network, a cellular network, etc.), a universal serial bus (USB) connection, a Bluetooth® interface connection, a near field communication (NFC) interface connection, etc. The shelf 102 may be in communication with more than one computing device 108 located at different locations. For example, a first computing device 108 in a retail establishment and a second computing device 108 in a remote central site. As used herein, the phrase "in communication," including variations thereof, encompasses direct communication and/or indirect communication through one or more intermediary components and does not require direct physical (e.g., wired) communication and/or constant communication, but rather additionally includes selective communication at periodic intervals, aperiodic intervals, scheduled intervals, and/or one-time events. The computing device 108 may alternatively be physically integrated into and/or attached to the smart shelf 102.

The shelf 102 includes a smart shelf mat 118 having a plurality of example sensors therein, one of which is designated at reference numeral 120, for sensing the presence and absence of a divider 104-106 as well as shelf merchandise, one example of which is designated at reference numeral 122. In some examples, the smart shelf mat 118 senses the presence and absence of a divider 104-106 and not the shelf merchandise, and an optional separate sensing system may be used to sense the presence and absence of the shelf merchandise. This optional sensing system may be of the same type or different than that of the smart shelf mat 118. As shown in FIG. 1, the sensors 120 may be arranged in an array of sensors 124. While only shown in a portion of the shelf 102, in practice, the array of sensors 124 will extend over at least the portion(s) of the shelf 102 in which a divider 104-106 may be located. Moreover, other arrangements of sensors may be implemented. In some examples, the sensors 124 are sensitive to force, pressure, etc. If a divider 104-106 applies a force, pressure, etc. to the mat 118 when installed, outputs of the sensors 120 beneath the installed divider 104-106 will be activated (e.g., have an output representing a logic '1'). Which of the sensors 120 in which pattern are activated can be used to determine the location(s) of dividers 104-106. A divider 104-106 may be installed to a shelf using clips, brackets, catch, etc. In some examples, the shelf 102 collects sensor outputs and provides them to the computing device 108 for further processing. In some examples, the shelf 102 processes the sensor outputs to determine the locations of dividers and provides the locations to the computing device 108. In some examples, the shelf 102 sends sensor outputs periodically, aperiodically, and/or as they change to the computing device 108, and the computing device 108 determines the locations of the dividers 104-106.

In some examples, one or more characteristics (e.g., dimension(s), weight, etc.) of the items, merchandise, etc. 122 are detected by the sensors 120. The items 122 may, additionally and/or alternatively, be sensed by other sensors (e.g., of different type, size, arrangement, etc.) of the shelf. Additionally and/or alternatively, one or more characteristics of the shelf merchandise 122 may be detectable, readable, identified, etc. by a camera, reader, scanner, etc. A camera may be a shelf level camera, a ceiling mounted camera, a handheld camera, etc. In some examples, detected, sensed, etc. characteristics of stocked, sensed, detected items 122 in a lane adjacent to a divider or between an adjacent pair of dividers are accessed. The detected, sensed, etc. characteristics are compared with the characteristics stored in a database of product information for the item that is intended to be stocked in the lane thereby determining, verifying, confirming, etc. whether the correct product has been stocked in the lane.

Figure 2:
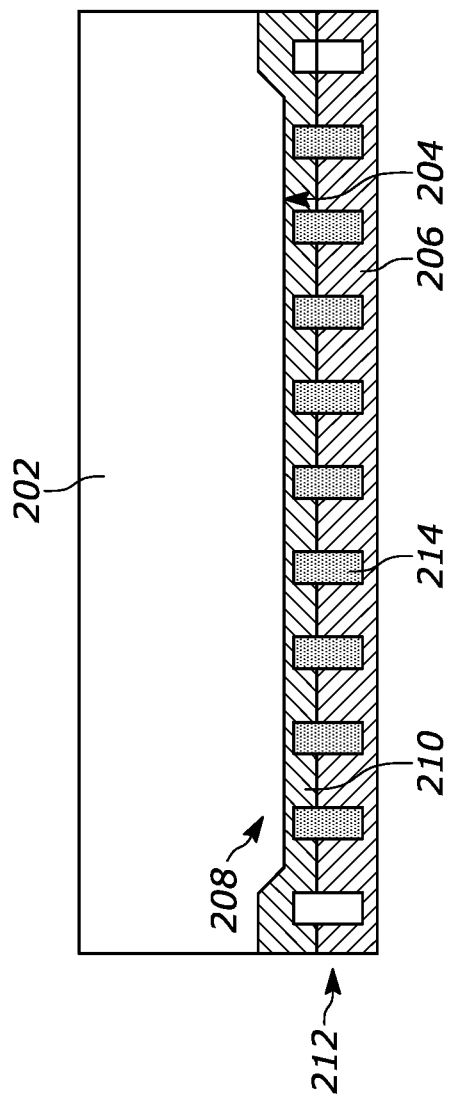
FIG. 2 is a side cross-section view of an example divider and mat interaction.

Referring to a side cross-section view in FIG. 2, an example divider 202, which is representative of a divider 104-106 of FIG. 1, has a straight, linear, flat, etc. bottom edge 204. Other shapes may be used. When installed to a shelf 206, the bottom edge 204 applies force to the shelf 206 forming a linear indentation or impression 208 in the mat 210 of the shelf 206. In response to the pressure applied to the mat 210 in the impression 208, outputs of a portion of a line of sensors 212 depicted with stippling, one of which is designated at reference numeral 214, are activated. In FIG. 2, the line of activated sensors 212 indicates a straight divider 202 and the location of the line of activated sensors 212 in the mat 210 indicates the location of the divider 202 on the shelf 206. Any number and/or type(s) of other sensor types may be used, such as capacitive, resistive, optical, light sensing, Hall, etc. Furthermore, the divider 202 need not be straight, but may have other shapes such curved, angled, etc. for use with other shaped shelves, displays, etc.

Figure 3:
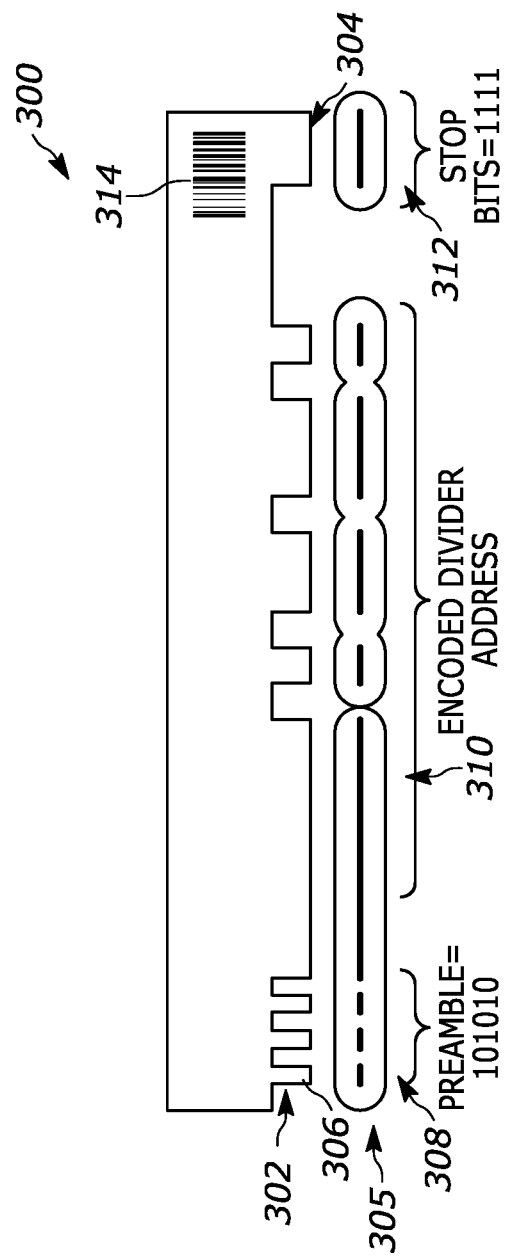
FIG. 3 illustrates another example divider.

Turning to FIG. 3, another example divider 300 has a unique physical pattern 302 on the lower edge 304 of the divider 300. When installed to a shelf, the bottom edge 304 applies pressures, forces, etc. to the mat of the shelf at different locations beneath the divider 300. The bottom edge 304 thereby forms a pattern 305 of indentations or impressions in the mat corresponding to the pattern 302 of the divider 300 against a mat. If for example, the size of the sensors of the mat correspond to the smallest feature width of the bottom edge, for example, a raised feature 306 and/or negatives thereof, then the sensor outputs can represent the pattern 302 as a digital sequence of ones and zeros. In some examples, portions of the bottom edge 304 can be assigned to different encodings of information. For example, a first portion 308 can represent a preamble of "101010", a second portion 310 can represent the unique encoded divider address of the divider 300, and a third portion 312 can represent stop bits of "1111." The preamble can reduce misinterpretation of another pattern having significance and signals the subsequent portion as being the divider's unique encoded divider address. The size and spacing of sensors on the mat of a shelf can be selected to convey different numbers of bits with a divider. The pattern 302 can be implemented with different shapes such as dimples, square patterns, etc. With this unique pattern 302 identifiable by the mat of the shelf, the specific divider's location on the shelf can be determined as well as any associations to nearby shelf merchandise.

In some examples, a divider such as the divider 300 includes a barcode 314 or other pattern for easy association of dividers with product IDs, universal product codes (UPCs), etc. For example, the barcode 314 may be identified during commissioning of a product on a shelf, and the pairing of the divider barcode 314 to the commissioned product may then be reflected in a planogram. For example, barcodes on a package XYZ and on the two dividers that demarcate the left and right borders of the corresponding shelf location for packages XYZ can be read during this commissioning process (for example, when the shelf is replenished with merchandise). Because the locations of the dividers (e.g., current, new, etc.) are automatically determined, the planogram for the shelf can be automatically updated to reflect where XYZ is located on the shelf. In some examples, the barcode 314 can be located on a front edge, a top edge, or a side of a divider 300 to allow the barcode 314 to be detectable/readable by a camera, reader, etc. A camera may be a shelf level camera, a ceiling mounted camera, a handheld camera, etc. A barcode reader may be handheld.

Figure 4A:
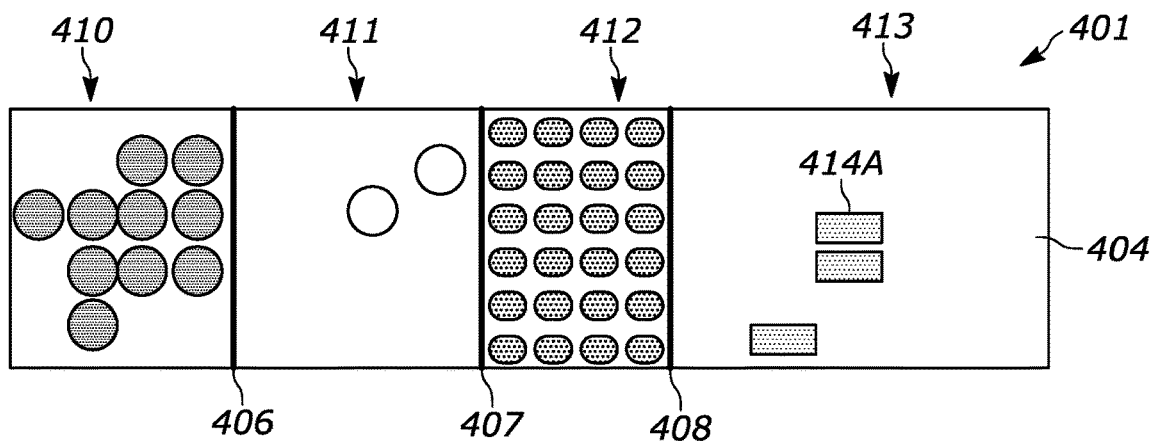
FIGS. 4A, 4B, and 4C illustrate example planograms resulting from facing and stocking activities.
Figure 4B:
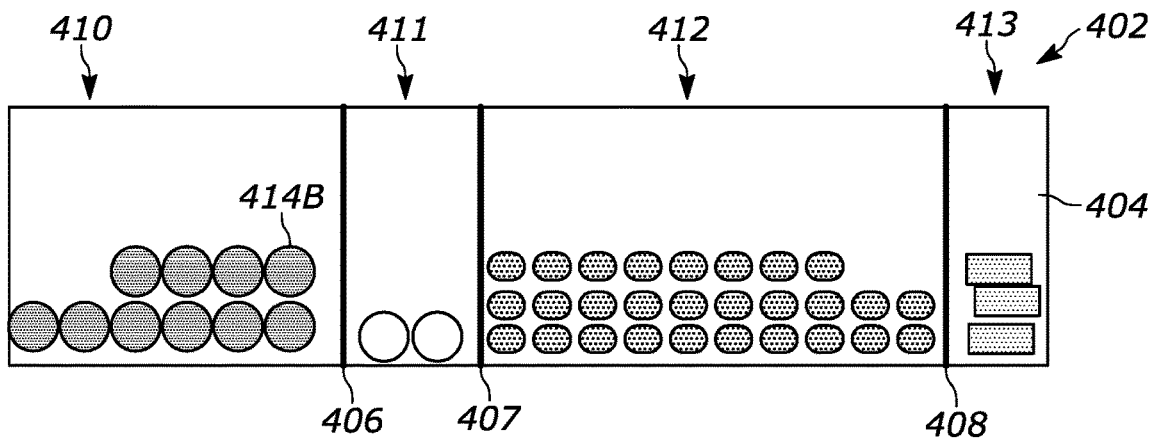
Figure 4C:
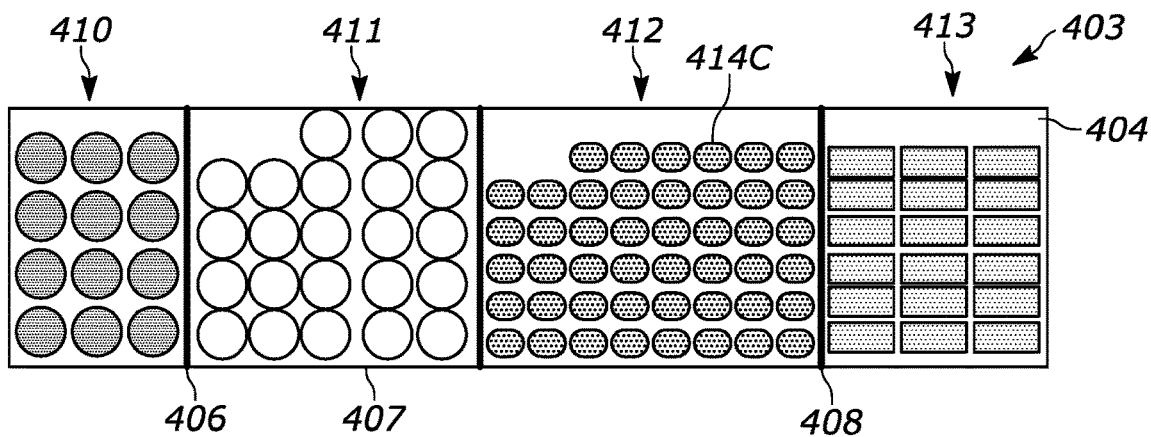

FIGS. 4A, 4B, and 4C depict a sequence of planograms 401, 402, and 403 showing how the arrangement of products on a shelf 404 can change. A planogram can be a diagram or model that indicates the placement of retail products on shelves, a visual representation of a store's products or services on display, etc. It is important to note the difference between an intended planogram and an actual planogram, which for clarity will also be referred to herein as a realogram. An intended planogram represents how the merchandise, dividers, and shelf labels are expected, targeted, planned, and/or intended to be located and/or arranged. A realogram represents the actual, real, or current locations and/or arrangement of merchandise, dividers, and shelf labels at a current time. In FIG. 4A, the planogram 401 shows dividers 406, 407, and 408 in first positions, forming lanes 410, 411, 412, and 413 in which products, one of which is designated at reference numeral 414A, are present. The dividers are in the locations prescribed in an intended planogram. However, as shown in FIG. 4A, while the products are positioned in their respective correct lanes, they may be haphazardly located due to shoppers interacting with them, buying them, etc. In the realogram 402 of FIG. 4B, with another arrangement of the dividers 406-408, the lanes 410-413 have changed, and the positions of products, one of which is designated at reference numeral 414B, changed as store personnel refaced, organized, and tidied the shelf 404. In particular, the dividers 406 and 408 were moved to the right to better distribute the products, such as 414B. In FIG. 4C, a further changed realogram 403 illustrates yet another arrangement of the dividers 406-408, lanes 410-413, and products, one of which is designated at reference numeral 414C, resulting from store personnel, vendors, etc. restocking the shelf 404. In particular, the dividers 406 and 408 were moved to the left relative to their positions in FIG. 4B, to better distribute the products, such as 414C. As shown in FIGS. 4A-4C, activities normally performed by customers, store personnel, and vendors can cause the realogram for the shelf 404 to change over time. In accordance with aspects of the invention disclosed here, the planogram can be automatically updated based on the realogram.

The intended planogram can be a planogram stored prior to install time and/or can be determined at install time. For example, the location of a divider in an intended planogram can be an (initially) installed location of the divider. In some examples, the intended location for a divider 406-408 is based on an identifier associated with a divider. The identifier may be, for example, a barcode on the divider, a pattern on the bottom of the divider and sensed by the sensor outputs 120, etc.

Returning to FIG. 1, the shelf system 100 can be used to automatically determine the locations of the dividers 406-408, and to automatically determine the realogram, update the intended planogram, etc. of a shelf 102. As described above, the shelf 102 and/or the computing device 108 can process sensor outputs of the mat 118 to determine the locations of the dividers 104-106 and, in some instances, the identification of dividers. By automatically updating the planogram for a shelf, accuracy can be improved, the time consuming manual updating of planograms can be avoided, the need for an available mobile computer is relieved, and planograms can be updated in (near) real time. In some examples, dividers in accordance with aspects of this invention can be used with product pusher systems that push products to the front of a shelf as products are removed.

Figure 5:
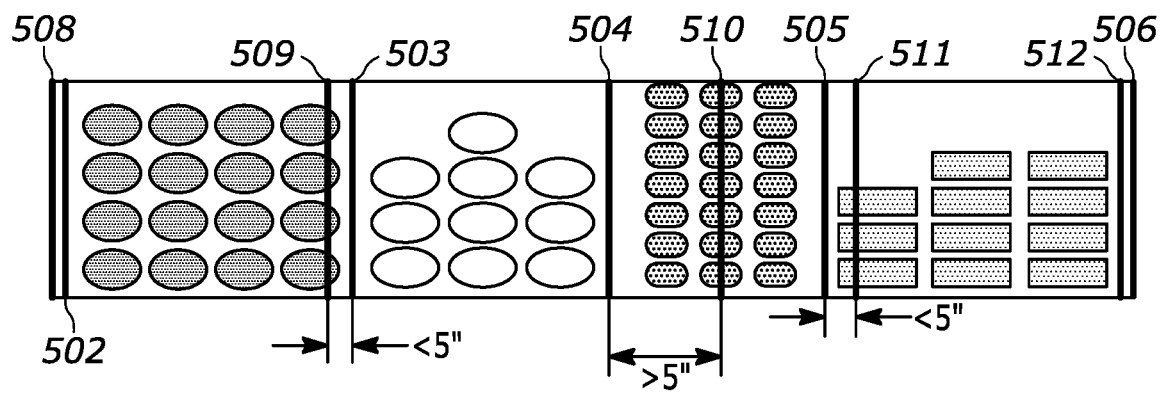
FIG. 5 illustrates an example diagram depicting an overlay of two planograms having respective sets of divider locations.

FIG. 5 illustrates an example diagram, image, etc. representing an overlay of a planogram and a realogram that can be formed by comparing, for example, the locations of a set of dividers in the planogram and in the realogram. In FIG. 5, dividers are or are intended to be at a first set of locations 502, 503, 504, 505, and 506. Dividers are actually at a second set of locations 508, 509, 510, 511, and 512. An overlay can, for example, reflect how dividers have moved during facing or stocking activities, etc. For example, the first locations 502-506 represent an initial installation of a set of dividers (e.g., an initial planogram stored upon installation of the dividers), and the second locations 508-512 represent current locations of dividers. An overlay can also reflect differences between an intended planogram and an actual planogram, or the realogram. They are often not the same. A corporate office may push a corporate planogram to its stores that do not reflect the specific details of a particular store's layout. For example, there could be a pole that runs through a shelf in one store that the corporate planogram doesn't accommodate. In another example, the specific size of the merchandise may be slightly different than what was expected, resulting in a change in how many products fit in the originally designated space. Furthermore, the associate who initially stocks the shelf when the new corporate planogram is released could make mistakes or simply take liberties in how products are stocked. In order to see how the lanes on the shelves were actually set up versus what was intended, the shelf system 100 can output a visual report such as that shown in FIG. 5 that overlays the intended setup versus the actual. A threshold could be set to only highlight differences greater than a predetermined tolerance. For example, if a shelf divider shows up in a location over five inches from its expected location, then that discrepancy can be visibly noted, depicted, or highlighted. Such overlays can be used by a store manager to check the work of employees, quickly showing the potential problem areas, and it could also be used by corporate as both a monitoring tool and a feedback mechanism for them to understand the nuances of each store, which can then be incorporated into future planograms.

Figure 6:
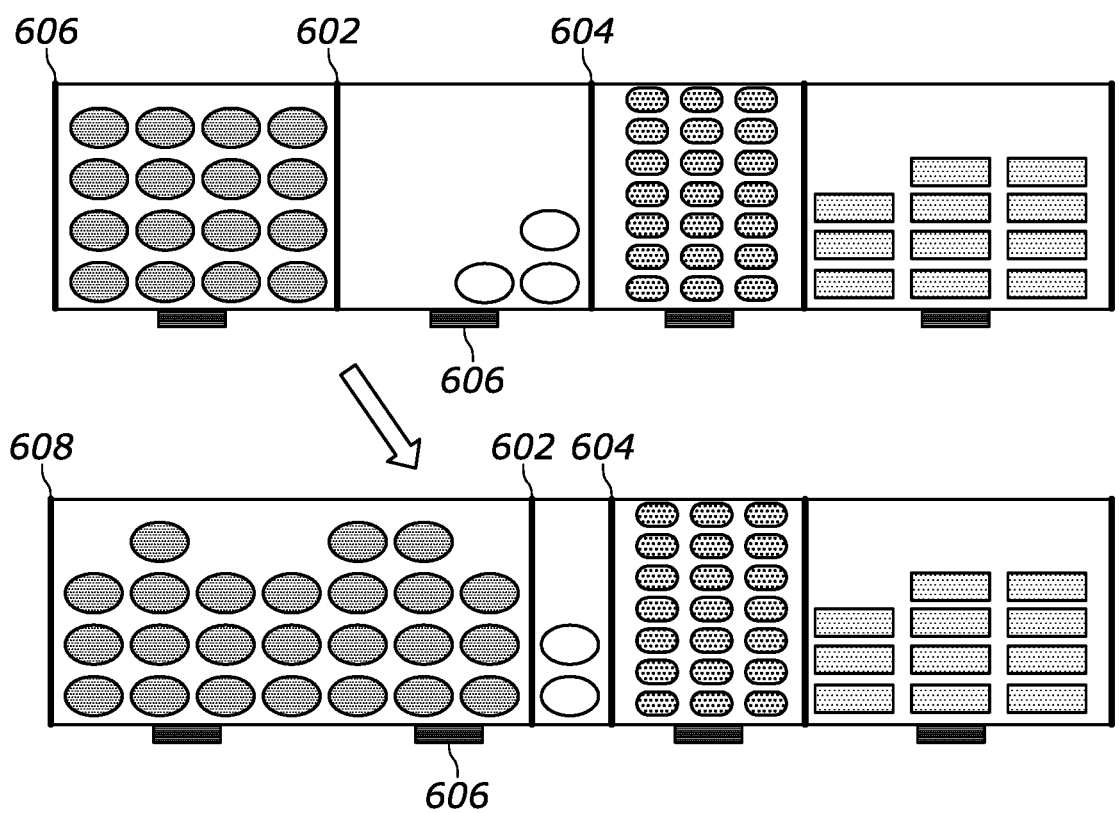
FIG. 6 illustrates a missing shelf label example.

In some examples, automatic divider locations can be used to check for and alert for the physical presence or absence of shelf price tags, e.g., electronic shelf labels (ESLs), paper shelf labels, etc. Typically, there should only be one physical price tag between two adjacent dividers. In some examples, a smart shelf can sense physical price tags in a similar way to how it locates dividers. For example, a price tag can apply a force, pressure, etc. to the front edge of the mat 118 when installed, and outputs of the sensors 120 beneath the installed price tag will be activated. Which of the sensors 120 in which pattern are activated can be used to determine the location of the price tag. If zero or more than one price tag is sensed in between two dividers, as shown in the bottom planogram of FIG. 6, then an alert can be sent to an associate to correct the error. Note how a divider 602 was shifted to the right in the bottom planogram of FIG. 6 relative to the top planogram of FIG. 6, but a price tag 606 was not moved. As a result, a price tag is now missing between the dividers 602 and 604, and the price tag 606 is now an extra price tag present between the dividers 608 and 602. This situation could occur when the merchandise and dividers are shifted but the price tags aren't moved in conjunction. This can also apply to ESLs in addition to conventional price tags and is especially pertinent in the European Union (EU), where there are strict fines for pricing labels not matching the merchandise.

Figure 7:
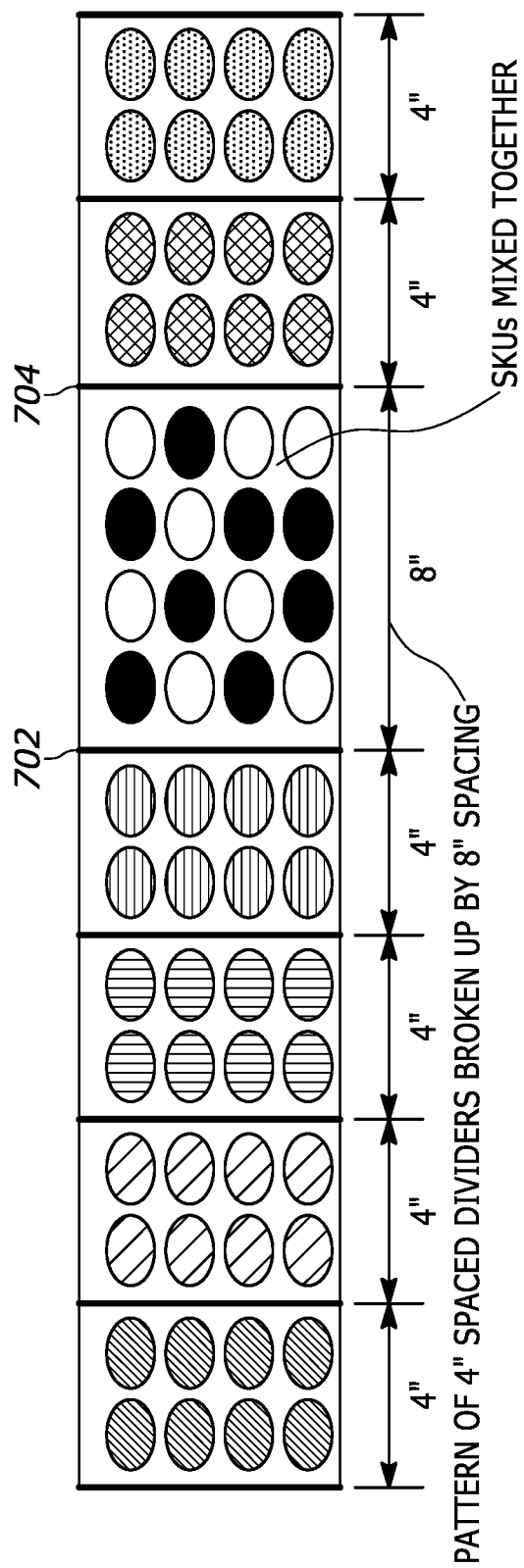
FIG. 7 illustrates a missing divider example.

In some examples, automatic divider locations can be used to check for and alert for missing dividers. The shelf system 100 can automatically identify, detect, and look for pattern discrepancies in the placement of dividers and send alerts accordingly. For example, as shown in FIG. 7, a series of dividers may be evenly spaced four inches apart, but one divider 702 is spaced eight inches from a neighboring divider 704. Such conditions could indicate that a divider is missing and different merchandise stock keeping units (SKUs) are inadvertently being mixed together. For example, a shelf could be stocked with soup cans of identical size but different flavors. Each lane established by the dividers is meant to be for a different specific soup variety, and all lanes are meant to be the same four inches wide. With a missing divider, two flavors of soup will get inappropriately mixed together. This disorganization will cause confusion and errors by both the retailer and the shopper, in addition to the problem of the merchandise being presented poorly. An alert can be sent to an associate to check the shelf. The shelf may have been set up incorrectly, or something may have happened to the existing divider (broken, moved, removed, etc.).

While a smart shelf system 100 is shown in FIG. 1, one or more of the elements, processes, components, devices, etc. illustrated in FIG. 1 may be combined, divided, re-arranged, omitted, eliminated, or implemented in any other way. Further, the smart shelf system 100 may include one or more elements, processes, components, devices, etc. in addition to, or instead of, those illustrated in FIG. 1, or may include more than one of any or all of the illustrated elements, processes, components, devices, etc.

Figure 8:
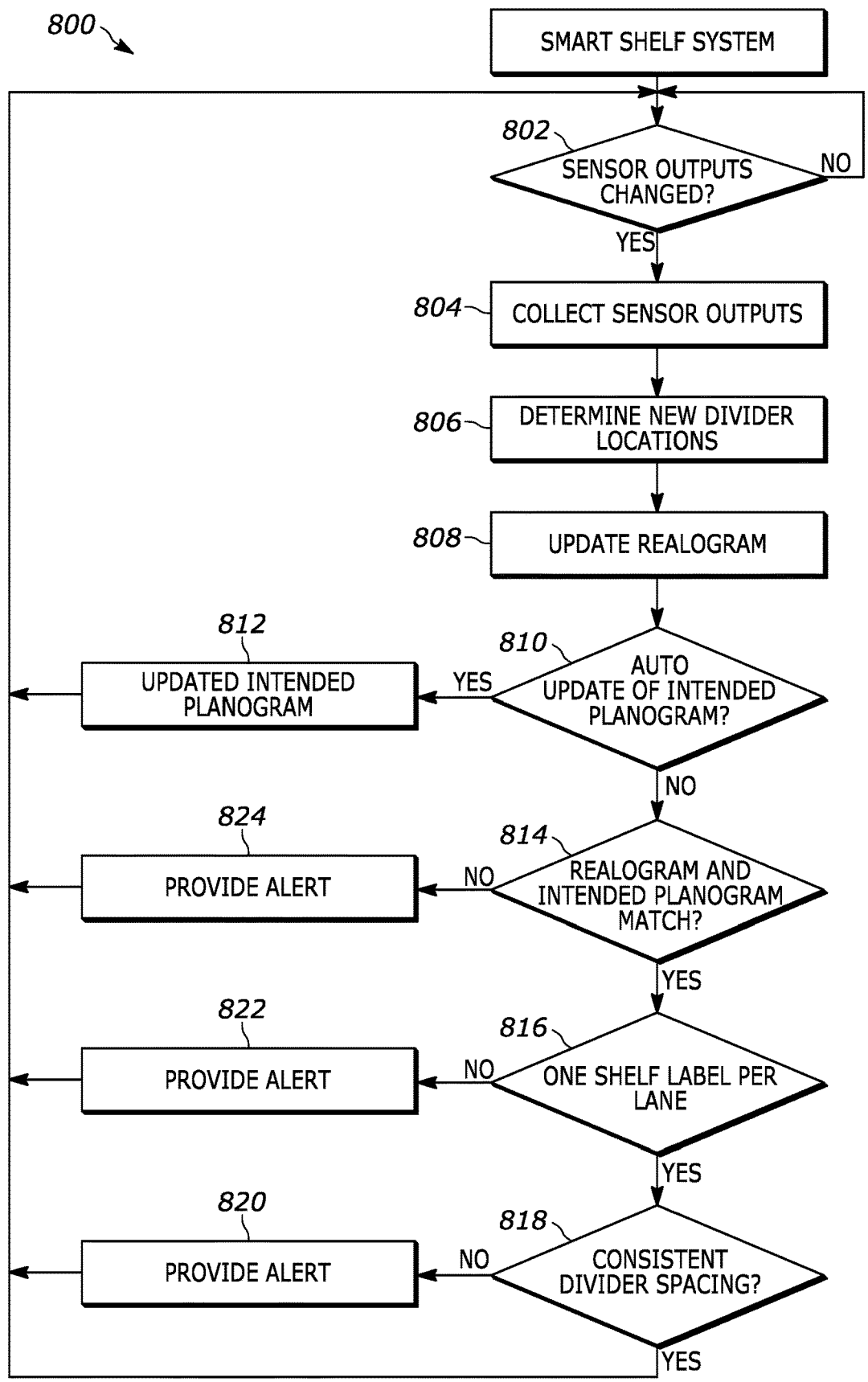
FIG. 8 is a flowchart representative of example methods, logic or machine-readable instructions for implementing the example shelf 102 and/or the example computing device 108 of FIG. 1, in accordance with aspects of described embodiments.

A flowchart 800 representative of example processes, methods, logic, software, computer- or machine-readable instructions for implementing the smart shelf system 100 is shown in FIG. 8. The program of FIG. 8 begins at block 802 with the shelf 102 waiting for sensor outputs with respect to the dividers to change and then collecting and sending, providing, etc. the sensor outputs to the computing device 108 (block 804). In some examples, all sensor outputs are sent together. Alternatively, only changed sensor outputs are sent. Alternatively, sensor outputs that have changed by a threshold amount are sent. Alternatively, the computing device 108 collects (block 804) the sensor outputs from the shelf 102. The sensor outputs are processed to determine the locations of the dividers 104-106 (block 806). The locations may be determined by the shelf 102 and/or the computing device 108. The computing device 108 updates the realogram (block 808). If the intended planogram is to be updated automatically (e.g., from the realogram) (block 810), the computing device 108 updates the intended planogram from the realogram (block 812). For example, each divider location in the intended planogram is updated to its corresponding divider location in the realogram. If the intended planogram matches the realogram (e.g., within a threshold distance) (block 814), the computing device 108 determines whether there is one shelf label per lane (block 816). If there is one shelf label per lane (block 816), the computing device 108 evaluates the planogram for consistent divider spacing (block 818). If the divider spacing is consistent (block 818), control returns to block 802 to wait for more sensor output changes. If the divider spacing is inconsistent based on a threshold distance (block 818), an alert is provided (block 820), and then control returns to block 802 to wait for more sensor output changes.

Returning to block 816, if a lane has no shelf label or has more than one shelf label (block 816), an alert is provided (block 822), and control returns to block 802 to wait for more sensor output changes.

Returning to block 814, if the intended planogram does not match the realogram (e.g., based on a threshold distance) (block 814), an alert is provided (block 824). Once alerted, the user can decide how to address the discrepancy. This includes updating the intended planogram to match the realogram. Control then returns to block 802 to wait for more sensor output changes. While shown in an example sequence in FIG. 8, blocks 814, 816, and 818 can be performed in other orders, in parallel, and/or any combination thereof.

Figure 9:
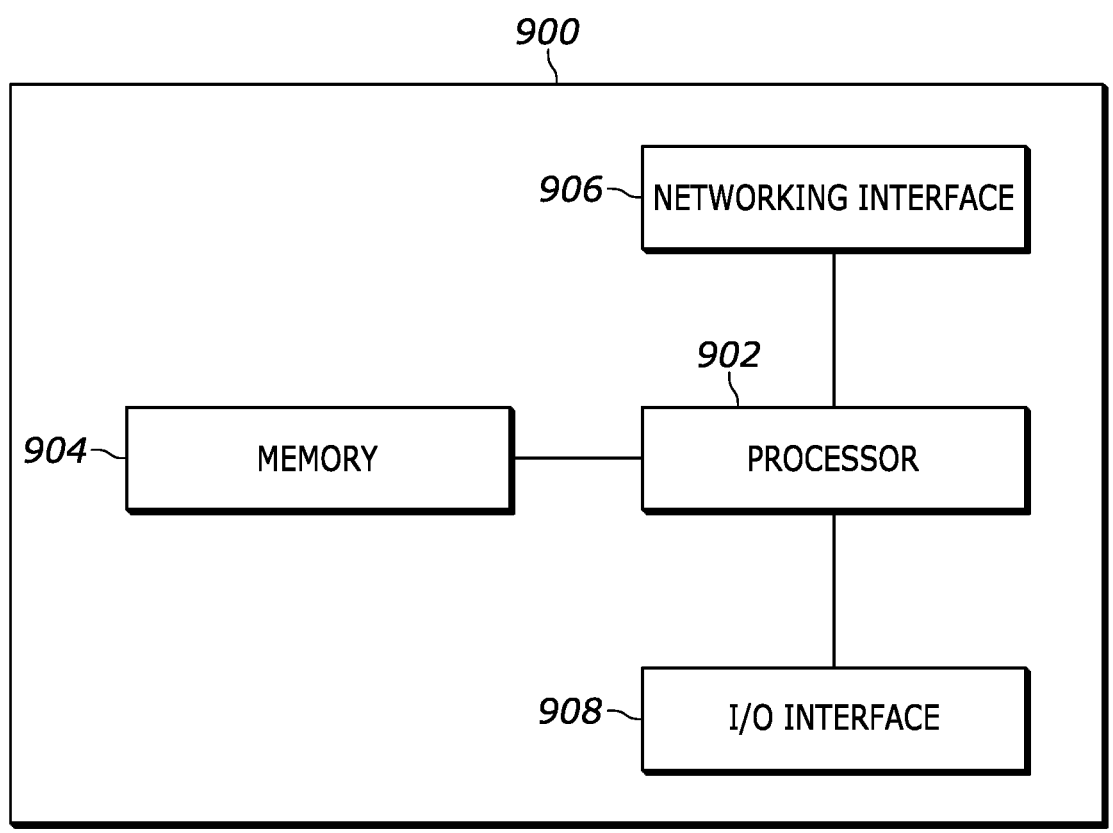
FIG. 9 is a block diagram of an example logic circuit to implement the example methods, apparatus, logic, and/or operations described herein.

FIG. 9 is a block diagram representative of an example logic circuit capable of implementing, for example, one or more components of the shelf 102 and/or the computing device 108. The logic circuit of FIG. 9 is a processing platform 900 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 900 of FIG. 9 includes an example processor 902 such as, for example, one or more microprocessors, controllers, and/or any suitable type of processor. The processing platform 900 of FIG. 9 includes memory (e.g., volatile memory, non-volatile memory) 904 accessible by the processor 902 (e.g., via a memory controller). The processor 902 interacts with the memory 904 to obtain, for example, machine-readable instructions stored in the memory 904 corresponding to, for example, the operations represented by the flowcharts and/or examples of this disclosure. Additionally or alternatively, machine-readable instructions corresponding to the example operations described herein may be stored on one or more removable media (e.g., a compact disc (CD), a digital versatile disk (DVD), removable flash memory, etc.) that may be coupled to the processing platform 900 to provide access to the machine-readable instructions stored thereon. The machine-readable instructions may be executed by the processor 902 to implement the shelf 102 and/or the computing device 108. The memory 904 may additionally store planograms, including realograms, in a database of planograms at the computing device 108, a remote corporate server, etc.

The example processing platform 900 of FIG. 9 also includes a network interface 906 to enable communication with other machines via, for example, one or more networks. The network interface 906 includes any suitable type of communication interface(s) (e.g., wired and/or wireless interfaces) configured to operate in accordance with any suitable protocol(s). The network interface 906 may be used to communicatively couple the shelf 102 and/or the computing device 108.

The processing platform 900 of FIG. 9 also includes input/output (I/O) interfaces 908 to access sensor outputs from the mat 118.

Although FIG. 9 depicts the I/O interfaces 908 as a single block, the I/O interfaces 908 may include a number of different types of I/O circuits or components that enable the processor 902 to communicate with peripheral I/O devices. Example interfaces 908 include an Ethernet interface, a universal serial bus (USB) interface, a Bluetooth® interface, a near field communication (NFC) interface, and/or a PCI Express interface. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

The above description refers to a block diagram of the accompanying drawings. Alternative implementations of the example represented by the block diagram include one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more DSPs, one or more ASICs, one or more FPGAs, one or more MCUs, one or more hardware accelerators, one or more special-purpose computer chips, and one or more SoC devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method comprising:
   determining a current position of a divider on a smart shelf based on sensor outputs of the smart shelf at the current position responsive to the divider positioned at the current position;
   comparing the current position of the divider to an intended position of the divider; and
   providing a first alert when the current position of the divider does not match the intended position of the divider.

2. The method of claim 1, wherein the intended position of the divider is a target position for the divider indicated in a planogram.

3. The method of claim 2, wherein the planogram is stored in a planogram database for the shelf at least one of a) prior to installation of dividers to the smart shelf, or b) based on actual divider locations once installed to the smart shelf.

4. The method of claim 1, wherein the intended position of the divider is an initially installed position of the divider.

5. The method of claim 1, further comprising updating the intended position based on the current position.

6. The method of claim 1, further comprising:
   accessing an identifier for the divider;
   locating the position of the divider in a planogram based on the identifier;
   determining the intended position for the divider based on the position of the divider in the planogram; and
   comparing the current position of the divider with the intended position of the divider.

7. The method of claim 6, further comprising:
   sensing one or more characteristics of a product present in a lane adjacent to the divider; and
   determining whether the product is an intended product for the lane based on the sensed one or more sensed characteristics.

8. The method of claim 6, wherein accessing the identifier for the divider includes processing sensor outputs of the smart shelf representing a pattern of at least one of a) a plurality of raised features or b) a plurality of negative equivalents thereof on the divider in contact with the smart shelf, wherein the pattern represents the identifier for the divider.

9. The method of claim 8, wherein the pattern includes a preamble configured to reduce misinterpretation of another pattern as the identifier.

10. The method of claim 6, wherein accessing the identifier for the divider includes accessing a barcode on the divider for the purpose of associating a product ID or a UPC with the divider.

11. The method of claim 6, wherein accessing the identifier for the divider includes accessing a barcode on the divider using at least one of a shelf level camera, a ceiling mounted camera, a handheld mobile computer, or a scanner.

12. The method of claim 1, wherein the sensor outputs are first sensor outputs, and further comprising:
   determining a plurality of positions of a plurality of shelf labels on the smart shelf based on second sensor outputs of the smart shelf;
   determining a plurality of positions of a plurality of dividers on the smart shelf based on third sensor outputs of the smart shelf; and
   when a plurality of shelf labels are between a pair of dividers, providing a second alert.

13. The method of claim 12 wherein at least one of the shelf labels is an electronic shelf label.

14. The method of claim 1, wherein the sensor outputs are first sensor outputs, and further comprising:
   determining a plurality of positions of a plurality of shelf labels on the smart shelf based on second sensor outputs of the smart shelf;
   determining a plurality of positions of a plurality of dividers on the smart shelf based on third sensor outputs of the smart shelf; and
   when no shelf label is between a pair of dividers, providing a second alert.

15. The method of claim 1, wherein the sensor outputs are first sensor outputs, and further comprising:
   determining a plurality of positions of a plurality of dividers on the smart shelf based on second sensor outputs of the smart shelf;
   identifying whether there is an inconsistency in an arrangement pattern of the plurality of the dividers; and
   when the inconsistency is identified, providing a second alert.

16. The method of claim 1, wherein the sensor outputs are first sensor outputs, and further comprising:
   determining a plurality of positions of a plurality of shelf labels on the smart shelf based on second sensor outputs of the smart shelf;
   determining a plurality of positions of a plurality of dividers on the smart shelf based on third sensor outputs of the smart shelf;
   creating an actual planogram based on the plurality of positions of the plurality of shelf labels on the smart shelf and the plurality of positions of the plurality of dividers; and
   creating a depiction of an overlay of an intended planogram and the actual planogram.

17. The method of claim 16, further comprising omitting from the overlay a difference between the intended planogram and the actual planogram based on a comparison of the difference and a threshold.

18. The method of claim 1, wherein detecting the current position of the divider on the smart shelf includes sensing a plurality of raised features of the divider in contact with the smart shelf.

19. The method of claim 1, wherein determining the current position of the divider on the smart shelf includes sensing a linear feature of the divider in contact with the smart shelf.

20. The method of claim 1, wherein the sensor outputs are associated with an array of sensors on a surface of the smart shelf.

21. The method of claim 20, wherein the array of sensors are at least one of a pressure sensor, a capacitive sensor, a resistive sensor, an optical sensor, or a light sensing sensor.

22. A method of operating a smart shelf system, the method comprising:
   automatically determining, with a smart shelf, a current position of a divider on the smart shelf;

comparing the current position of the divider to an intended position of the divider; and providing a first alert when the current position of the divider does not match the intended position of the divider.

23. The method of claim 22, wherein determining the current position includes determining the current position based on sensor outputs of a mat of the smart shelf.

24. The method of claim 22, wherein the intended position is at least one of defined in a planogram or an initially installed position.

25. The method of claim 22, further comprising:
accessing an identifier for the divider;
locating the position of the divider in a planogram based on the identifier;
determining the intended position for the divider based on the position of the divider in the planogram; and
comparing the current position of the divider with the intended position of the divider.

26. The method of claim 22, wherein accessing the identifier for the divider includes at least one of
accessing a barcode on the divider, or
processing sensor outputs of the smart shelf representing a pattern of at least one of a) a plurality of raised features or b) a plurality of negative equivalents thereof on the divider in contact with the smart shelf, wherein the pattern represents the identifier for the divider.

27. The method of claim 22, further comprising:
determining, with the smart shelf, a plurality of positions of a plurality of shelf labels on the smart shelf;
determining, with the smart shelf, a plurality of positions of a plurality of dividers on the smart shelf; and
when at least one of a) a plurality of shelf labels are between a pair of dividers or b) no shelf label is between a pair of dividers, providing a second alert.

28. The method of claim 22, further comprising:
determining, with the smart shelf, a plurality of positions of a plurality of dividers on the smart shelf;
identifying whether there is an inconsistency in an arrangement pattern of the plurality of the dividers; and
when the inconsistency is identified, providing a second alert.

29. The method of claim 22, further comprising:
determining, with the smart shelf, a plurality of positions of a plurality of shelf labels on the smart shelf;
determining, with the smart shelf, a plurality of positions of a plurality of dividers on the smart shelf;
creating an actual planogram based on the plurality of positions of the plurality of shelf labels on the smart shelf and the plurality of positions of the plurality of dividers on the smart shelf; and
creating a depiction of an overlay of an intended planogram and the actual planogram.

30. A non-transitory computer-readable storage medium comprising instructions that, when executed, cause a system to:
automatically determine, with a smart shelf, a current position of a divider on the smart shelf;
compare the current position of the divider to an intended position of the divider; and
provide a first alert when the current position of the divider does not match the intended position of the divider.

31. The non-transitory computer-readable storage medium of claim 30, wherein the instructions, when executed, cause the system to determine the current position based on sensor outputs of a mat of the smart shelf.

32. The non-transitory computer-readable storage medium of claim 30, wherein the intended position is at least one of defined in a planogram or an initially installed position.

33. The non-transitory computer-readable storage medium of claim 30, wherein the instructions, when executed, cause the system to:
access an identifier for the divider;
locate the position of the divider in a planogram based on the identifier;
determine the intended position for the divider based on the position of the divider in the planogram; and
compare the current position of the divider with the intended position of the divider.

34. The non-transitory computer-readable storage medium of claim 30, wherein the instructions, when executed, cause the system to access the identifier for the divider by at least one of
accessing a barcode on the divider, or
processing sensor outputs of the smart shelf representing a pattern of at least one of a) a plurality of raised features or b) a plurality of negative equivalents thereof on the divider in contact with the smart shelf, wherein the pattern represents the identifier for the divider.

35. The non-transitory computer-readable storage medium of claim 30, wherein the instructions, when executed, cause the system to:
determine, with the smart shelf, a plurality of positions of a plurality of shelf labels on the smart shelf;
determine, with the smart shelf, a plurality of positions of a plurality of dividers on the smart shelf; and
when at least one of a) a plurality of shelf labels are between a pair of dividers or b) no shelf label is between a pair of dividers, provide a second alert.

36. The non-transitory computer-readable storage medium of claim 30, wherein the instructions, when executed, cause the system to:
determine, with the smart shelf, a plurality of positions of a plurality of dividers on the smart shelf;
identify whether there is an inconsistency in an arrangement pattern of the plurality of the dividers; and
when the inconsistency is identified, provide a second alert.

37. The non-transitory computer-readable storage medium of claim 30, wherein the instructions, when executed, cause the system to:
determine, with the smart shelf, a plurality of positions of a plurality of shelf labels on the smart shelf;
determine, with the smart shelf, a plurality of positions of a plurality of dividers on the smart shelf;
create an actual planogram based on the plurality of positions of the plurality of shelf labels on the smart shelf and the plurality of positions of the plurality of dividers on the smart shelf; and
create an overlay of an intended planogram and the actual planogram.

* * * * *